Oct. 19, 1926.

E. E. REINKE

LEAF SPRING LUBRICATOR

Filed Nov. 3, 1924

1,603,981

E. E. Reinke, Inventor

By Clarence A. O'Brien, Attorney

Patented Oct. 19, 1926.

1,603,981

UNITED STATES PATENT OFFICE.

ERNEST EDWARD REINKE, OF SANTA ANA, CALIFORNIA.

LEAF-SPRING LUBRICATOR.

Application filed November 3, 1924. Serial No. 747,590.

This invention relates to improvements in leaf spring lubricators and has for its principal object to provide a simple and efficient means whereby the leaves of each of the leaf springs of a motor vehicle may be lubricated in such a manner as to obviate the necessity of having to employ a grease gun or the like for supplying the lubricant to the superimposed leaves.

A further object of the invention is to provide a leaf spring lubricator wherein a lubricant is distributed between the laminations or leaves so as to prevent the accumulation of rust on the leaves and further eliminate the usual squeaky noises.

A further object of the invention is to provide a leaf spring lubricator of the above mentioned character, wherein means is provided for preventing dust and other foreign substance from coming in contact with the absorbent material which is saturated with the lubricant.

A further object of the invention is to provide a leaf spring lubricator of the above mentioned character, which is of such construction as to permit the same to be easily and readily attached in position on the leaf springs of a motor vehicle, the device being simple in construction, inexpensive, strong and durable and furthermore adapted for the purposes for which it is designed.

Other objects and advantages of this invention will become apparent during the course of the following description.

In the accompanying drawing forming a part of this specification and in which like numerals designate like parts throughout the same:

Figure 1:
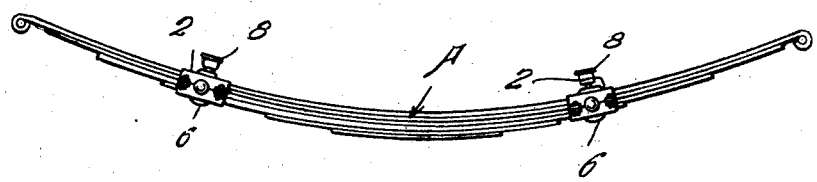
Figure 1 is a side elevation of the leaf spring lubricator embodying my invention showing the same attached in position on an automobile leaf spring adjacent each of the ends thereof.

In the drawing, wherein for the purpose of illustration is shown the preferred embodiment of my invention, the numeral 1 designates an absorbent pad which is preferably formed of light felt material and is of a suitable width. The absorbent pad 1 is adapted to extend around the laminations or superimposed leaves of an automobile leaf spring designated generally by the letter A adjacent each of the ends thereof. Each of the absorbent pads 1 is secured in position around the leaves of the leaf spring through the medium of a sheet metal casing 2 which is open at its respective ends, the free ends of the casing terminating in the laterally extending flanges 3 and 4 for receiving the fastening members 5. The metallic casing 2 is adapted to extend beyond the ends of the absorbent pad 1 in the manner more clearly illustrated in Figure 2 and the purpose thereof will be presently apparent.

Formed in the intermediate portion of the top, bottom, and sides of each of the casings 2 are the stamped out reservoirs or containers 6. An absorbent pad preferably of heavy felt material is placed in each of the reservoirs or containers 6 and is illustrated at 7. The heavy felt absorbent pads 7 are adapted for cooperation with the light felt absorbent pad 1 in the manner hereinafter to be more fully described.

A lubricant supply cup 8 is threaded into a suitable opening provided in the container formed on the top of each of the casings 2 whereby the oil in the cup 8 will be fed by gravity to the absorbent material. The oil will pass downwardly and the absorbent pad 1 will become saturated therewith and further the heavy felt pads 7 will also become saturated.

The heavy felt pads 7 disposed within the containers 6 provide a means for constantly feeding the oil to the lighter felt pad 1 and as the latter extends completely around the laminations or leaves of the leaf spring A, the oil will be distributed between the laminations, thereby efficiently oiling the same.

Figure 2:
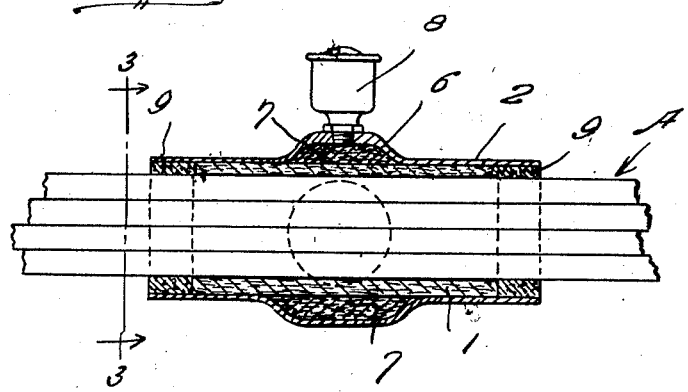
Figure 2 is a central longitudinal sectional view thereof.
Figure 3:
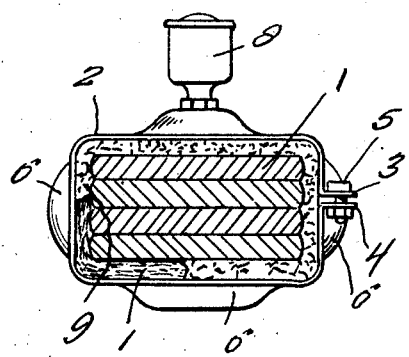
Figure 3 is a sectional view taken approximately on line 3—3 of Figure 2.

For the purpose of preventing dirt and other foreign substances from coming in contact with the absorbent pad 1 and to further prevent the leakage of the oil from the pad 1 through the open ends of the casing 2, I provide a cork band 9 which extends around the leaves of the spring A adjacent the ends of the absorbent pad 1, the bands 9 being of such width as to have their outer edges lying substantially flush with the respective ends of each of the casings 2 in the manner more clearly illustrated in Figure 2.

It will thus be seen from the foregoing description, that a leaf spring lubricator has been provided which will prevent the accumulation of rust on the laminations or leaves of each of the springs of an automobile and further the leaf springs will at all times be supplied with the proper lubrication for preventing and eliminating the squeaky noises.

While I have shown the preferred embodiment of my invention, it is to be understood that various changes in the size, shape and arrangement of parts may be resorted to without departing from the spirit of the invention and the scope of the appended claim.

Having thus described the invention, what I claim is:—

A leaf spring lubricator including an absorbent pad extending around the leaf spring, a casing adapted to be clamped about the pad, said casing having four sides, each side being provided with a central bulge forming a container, means in each of said containers for receiving the lubricant, a lubricant supply means associated with the casing, and means extending around the leaf spring adjacent the edges of the absorbent pad and disposed within the open ends of the casing providing a seal for the pad.

In testimony whereof I affix my signature.

ERNEST EDWARD REINKE.